Dec. 1, 1959   R. LILJEBLAD   2,915,446
GAS COOLED NUCLEAR REACTOR
Filed Feb. 1, 1955   2 Sheets-Sheet 1
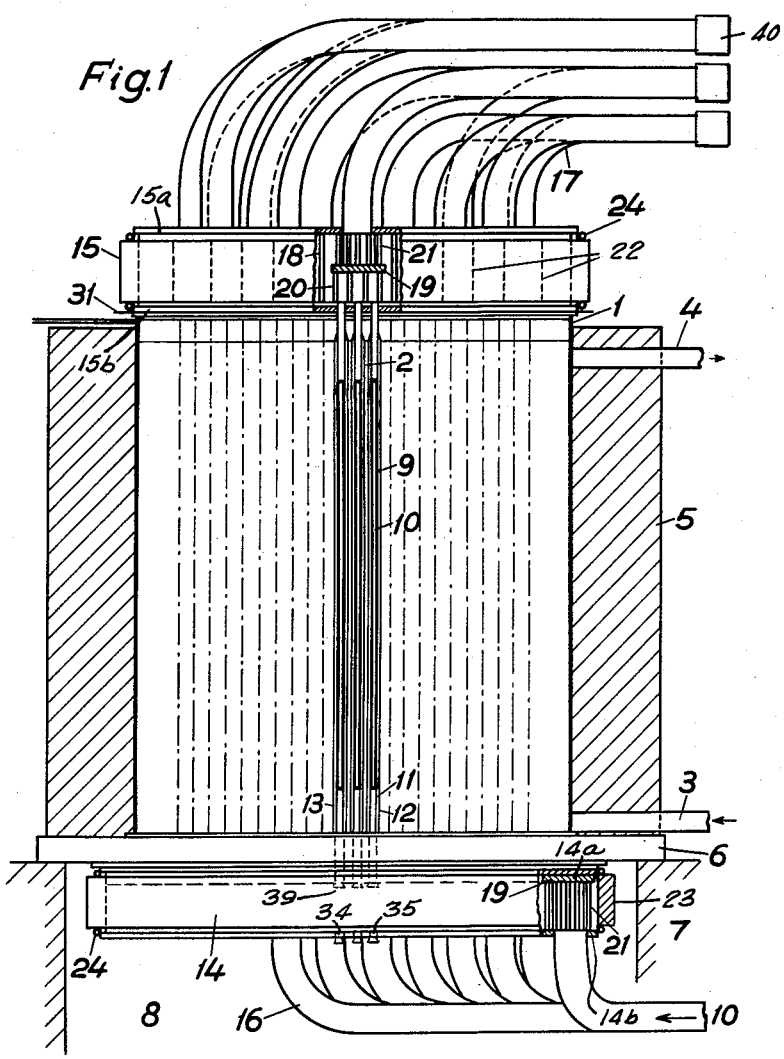
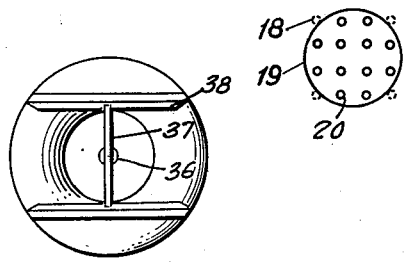
Inventor
Ragnar Liljeblad
By
Attorney.

Dec. 1, 1959 R. LILJEBLAD 2,915,446
GAS COOLED NUCLEAR REACTOR
Filed Feb. 1, 1955 2 Sheets-Sheet 2
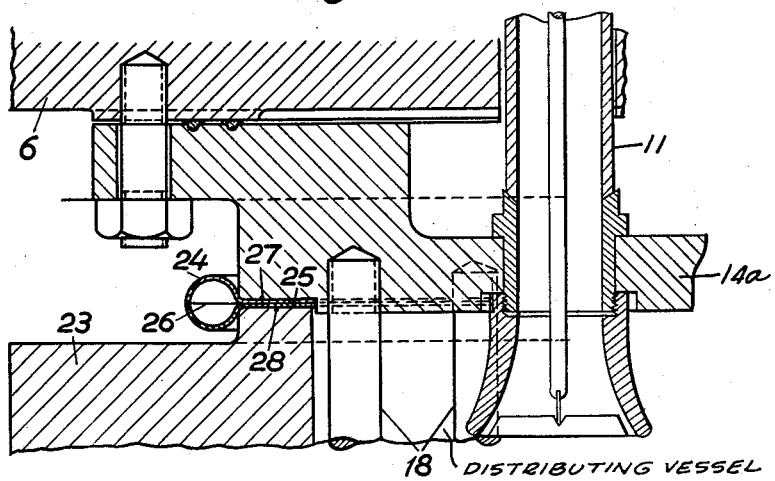
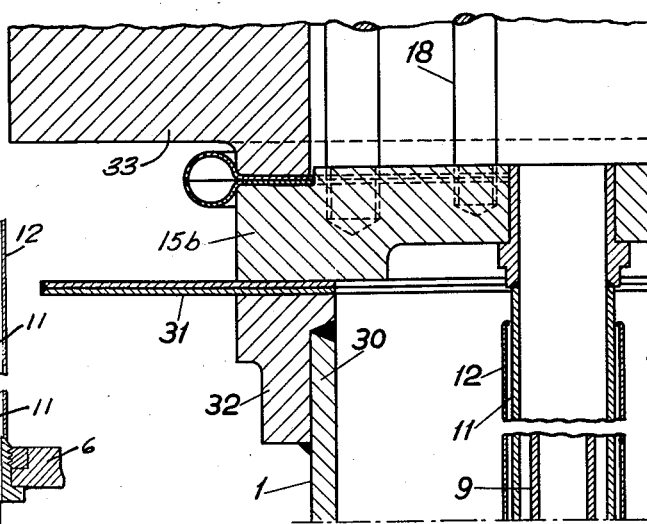
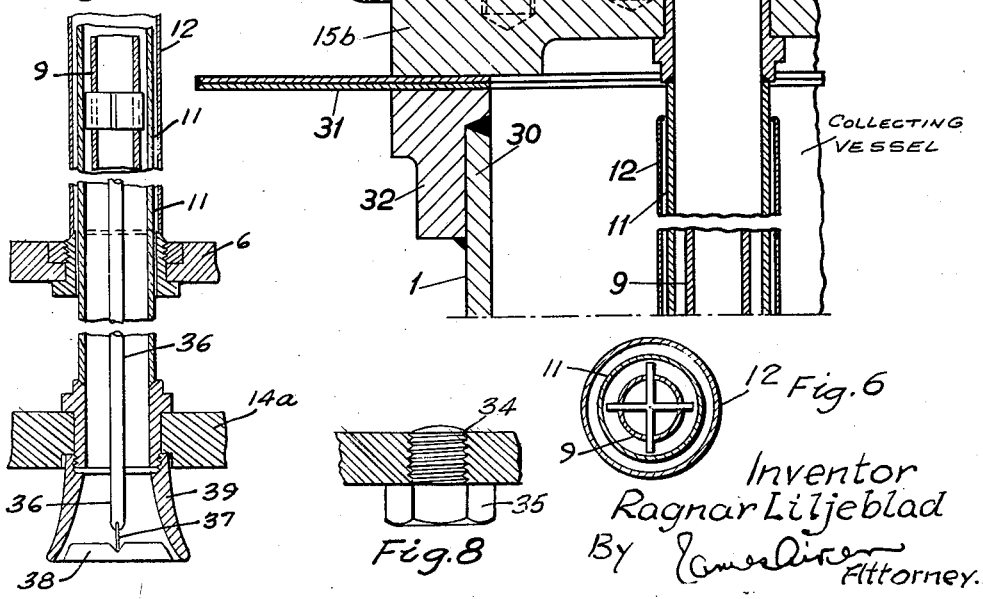
Inventor
Ragnar Liljeblad

# United States Patent Office 2,915,446
Patented Dec. 1, 1959

2,915,446

GAS COOLED NUCLEAR REACTOR

Ragnar Liljeblad, Vasteras, Sweden, assignor to Allmanna Svenska Elektriska Aktiebolaget, Vasteras, Sweden, a Swedish Corporation Application February 1, 1955, Serial No. 485,529

Claims priority, application Sweden November 29, 1954

6 Claims. (Cl. 204—193.2)

In atom reactor equipment it has been proposed to use, as transmission medium for the heat generated in the reactor to the steam generator, molten metal, for instance liquid sodium, which, however, is combined with some disadvantages. If the molten metal comes in contact with water or air, explosions occur, and the tendency of the metal to absorb neutrons reduces the reactivity of the reactor. Instead of molten metal also pressurized gases have been suggested, e.g. helium compressed at 10 atm., which are chemically indifferent, which have relatively low specific heat, and which do not absorb neutrons in quantities worth mentioning.

The present invention is based on the idea that the high pressurized gases, preferably helium, or $CO_2$ due to its high specific heat, within the pressure range of over 30 atm. and preferably at a pressure of about 60 atm. are especially suitable for the purpose in question. With the use of such a high pressure, however, there are various construction problems, the solution of which is a condition for the realization of the idea. It is the purpose of the present invention to disclose new structural details in combination with the use of high pressurized gases.

The invention will be described with reference to the accompanying drawing in which Fig. 1 is a diagrammatical view of a reactor equipment partly in section showing the details which constitute the features of the invention.

Figs. 2a and 2b are plan views of a detail of the construction,

Figs. 3 and 4 show other details in enlarged scale.

Figs. 5, 6 and 7 are detail views showing the fuel rod within the enclosing tubes; Fig. 5 being a vertical section, Fig. 6 being a horizontal section and Fig. 7 being an inverted plan view.

Fig. 8 is a detail of a plug arrangement.

The embodiments disclosed are shown only by way of example and may be modified without departing from the scope of the invention.

Referring to Fig. 1, the reactor consists of a tank 1 of aluminium, for instance, which is filled with a fluid 2, such as heavy water at atmospheric pressure, serving as moderator, which fluid is fed in and out by inlet and outlet pipes 3 and 4, respectively, connected to a heat exchanger, not shown, and having the double purpose to cool the moderator fluid and to pre-heat the feed water for a steam turbine. The tank 1 is surrounded by a mantle 5 of graphite serving as neutron reflector and rests upon a steel plate 6 supported by a basement 7. Within the reactor tank there are inserted rods 9 made of uranium or thorium having such a cross-section that the highly pressurized gas 10 used as cooling and heat transmission medium can flow along the rods. They may therefore be hollow, as shown on the drawing, or have another shape of cross-section, for instance H-shape. The rods 9 are inserted with play and suitably by means of distance members within the tubes 11, for example of zirconium or beryllium, which in their turn are surrounded by other tubes 12 of similar material, the inside diameter of which is somewhat larger than the outside diameter of the tubes 11, so that a heat insulating space 13 is formed between the tubes, which space may be filled with gas. The ends of the tubes 11 are gastightly fixed in the cover of a gas distributing vessel 14 and in the bottom of a gas collecting vessel 15 for the compressed gas. For the sake of simplicity only some of the rods with associated tubes are shown on the drawing, but in reality there are a great number of the same in a reactor. Attached to the bottom of the distributing vessel 14 are a plurality of inlet pipes 16, and to the cover of the collecting vessel 15 a plurality of outlet pipes 17. It is the purpose of the present invention to provide said distributing and collecting vessels 14 and 15, respectively, with different new and useful structural details, which are necessary because of the use of the excessively high pressure of the gas, and which are the objects of the present invention.

One inconvenience due to the use of gas as a coolant instead of a liquid is the great pumping power. In order to reduce it, the collecting vessel 15 is siutably divided by means of welded sheet walls 22 into a number of substantially circular ring-shaped chambers having the outlet pipes 17 for the gas connected to their upper parts and to individual pumps 40. Although the energy development is greatest in the center portion of the reactor but decreases considerably towards the periphery, by this arrangement the same temperature of the coolant may be attained and considerably lower pumping power is required as if the temperature should be equalised only by throttling the cross-section of the flow of the gas within the tubes towards the periphery.

The bottom and cover of the distributing vessel 14 are designated by 14a and 14b respectively and the bottom and cover of the collecting vessel 15 by 15a and 15b respectively. The bottoms and covers are provided with a corresponding number of holes for fitting-in the inner zirconium tubes 11. Due to the high pressure within the vessels, the said bottoms have to be stayed, which is performed by a great number of screw bolts 18, suitably two for each tube, on the average. On those places where the inlet and outlet pipes, respectively, are attached to the bottoms there is no material in which these bolts can be fixed. According to a feature of the invention, on these places strong circular discs 19 having slightly larger diameter than the diameter of the orifices of the pipes are arranged between and parallel with the bottoms of the vessels. These discs are held by a number of bolts 20 corresponding to the bolts 18, which normally hold together said bottoms and which are screwed in the bottom opposed to the openings, and by a circle of bolts 21 arranged around each opening. Figs. 2a and 2b show the positioning of the bolts on the lower and upper sides, respectively, of the disc. The inlet pipes of the distributing vessel are suitably arranged near the periphery of the vessel and the inside diameter of the wall 23 of the distributing vessel 14 is chosen so large that the inlet pipes can be attached outside of that portion of the bottom 14b which is perforated by holes 34 (Fig. 1) the purpose of which will be described later in connection with the method for the renewal of the fuel rods 9. In this case the discs 19 may be fixed directly on the lower side of the cover, as shown in Fig. 1.

Another feature of the invention having direct connection with the use of high compressed gases is the solution of the tightening problem. Especially the tightening between the bottoms and the walls of the distributing and collecting vessels requires particular measures. In vessels having a diameter of some meters—such dimensions have the vessels used for the purposes in question—the increase of the diameter reaches an order of magnitude of several millimeters. In order to avoid radial tensile stresses in the plane bottoms which already are subjected to radial bending stresses because of the pressure, the junction between the bottoms and the cylindrical wall has to be made slidable. This renders the tightening difficult—whether it is made by welding or in another manner—especially since only inorganic tightening material can be employed. According to the invention, the tightening means consists of a slitted sheet tube having parallel sheet flanges along the edges of the slit, which flanges each are welded gas-tightly to the surfaces of the vessel between which the tightening is to be made. Said tightening rings are indicated in Fig. 1 by the numeral 24. Fig. 3 shows in enlarged scale a section through a part of the lower vessel 14 with the tightening means according to the invention. The members are held together by the above named bolts 18, the nuts of which are gas-tightly welded to the cover or tightened in another way. The tightening means between the cover and the wall consists of a slitted tube 24 having parallel flanges 25. The tube is suitably manufactured integrally and bent to conform with the periphery of the vessel, whereafter its ends are welded together so that the tube forms a ring. Thereafter the tube is cut open along the line 26 diametrically opposed to the parallel flanges 25. The flanges 25 of the two tube halves can now be welded gas-tightly to the engagement surfaces 27 and 28 of the cover and wall, respectively. Thereafter the tube halves are welded together along the line 26. The diameter of the tube shall be so small that the tube having a wall thickness of 1 mm. or less bears the over-pressure in the vessel. The tightening means described allows a slight displacement of the engagement surfaces 27 and 28 with respect to each other. It is also possible to manufacture the tube in the shape of two substantially symmetrical ring halves each having a flange, which halves after being welded to the corresponding engagement surfaces are welded together along the line 26. Means of the kind described are also provided for tightening the bottom 15b towards the wall 33 of the vessel 15 as indicated in Figs. 1 and 4.

The bottom 15b of the collecting vessel 15 serves suitably also as cover 29 for the reactor tank. The upper ends of the outer zirconium tubes 12 which lie above the level of the heavy water are not fixed to the inner tubes 11, but they allow for the latter a slight movement, which movement is necessary with respect to the different dilation of the outer and inner zirconium tubes because of their different temperatures. According to a further object of the invention which is shown in Fig. 4, the rise of inadmissible heat stresses of the zirconium tubes is prevented in that the bottom 15b is joined to the wall 30 of the reactor tank 1 through an elastic tight junction consisting of two plane sheet rings 31 welded to the bottom 15b and the flange 32 of the wall 30, the outer edges of which are gas-tightly welded together. This junction acts as an expansion member and allows for the tubes a dilation of about ten millimeters.

The fuel rods inserted in the reactor tank have to be exchangeable and the exchange is performed in the arrangement in question from the chamber 8 below the reactor by drawing out and pushing in the rods through the distributing vessel 14, which cannot be removed or opened because of the excessively great number of tube welds and reinforcing bolts. The bottom 14b of the vessel, therefore, must be provided with a great number of holes 34, through which the rods can be moved. In the use of high pressure gases these holes have to be tightened against the pressure existing in the vessel in a reliable manner. Different kinds of plugs are suitable for this purpose. By way of example a threaded bolt 35 is shown.

The fuel rods 9 within the zirconium tubes 11 rest on thin pins 36, which in their turn rest with crossbars 37 on ribs 38 within the nuts 39 for the lower ends of said tubes or upon said plugs 35. The exchange is of course performed by remotely controlled tools, for example in that a plug of the kind used in wash basins, is pushed into the vessel 14 and the cross-bar is lifted out of engagement with the ribs. The fuel rod can then be drawn down into the chamber 8.

I claim as my invention:

1. Heterogeneous atom reactor comprising a reactor tank having cover and bottom members, fuel elements mounted in the cover and bottom members of said tank and comprising fuel rods, inner tubes of less neutron absorption power than the rods mounted in at least one of said members surrounding said rods, outer tubes mounted in spaced relation with and surrounding the said inner tubes and out of communication therewith, and providing heat insulation for a cooling medium, said medium being a gas at a pressure of above 30 atmospheres, means to cause said gas to flow through said inner tubes along the fuel rods, heavy water substantially at atmospheric pressure within said tank serving as a moderator fluid surrounding and in contact with said outer tubes, a lower vessel adjacent the bottom member containing means communicating with the inner tubes for distributing the said cooling medium to the individual inner tubes and having a plurality of inlet pipes, and an upper collecting vessel attached to the said tank adjacent the cover member communicating with the upper ends of the inner tubes and having a plurality of outlet pipes for collecting said cooling medium.

2. A reactor as claimed in claim 1 in which said gas is selected from the group consisting of helium and $CO_2$.

3. In a reactor as claimed in claim 2, annular sheet walls serving to divide the said collecting vessel into a plurality of substantially circular ring-shaped chambers for the collection of said gas and for the delivery thereof to individual pumping systems.

4. In a reactor as claimed in claim 1, in which said vessels comprise upper and lower walls, screw bolts holding the walls of each of said vessels together, openings in each vessel for the passage of the cooling medium, discs arranged in spaced relation to said openings and a circular series of bolts holding each of said discs in spaced relation to the openings.

5. In a reactor as claimed in claim 1, tightening means between said reactor tank and each of said vessels, such means consisting of slitted ring-shaped sheet tubes having parallel flanges along the edges of the slit welded to the adjacent edges of the tank and of said vessel.

6. In a reactor as claimed in claim 1, plates welded to the bottom of the collecting vessel and the upper part of the tank, said plates extending beyond the periphery of the vessel and tank, the portions of the plates between and adjacent the vessel and tank being unconnected, and the edges of the plates remote from the vessel and tank being welded together.

References Cited in the file of this patent

UNITED STATES PATENTS

| | | |
|---|---|---|
| 662,791 | Huber | Nov. 27, 1900 |
| 2,388,375 | Warner | Nov. 6, 1945 |
| 2,708,656 | Fermi et al. | May 17, 1955 |
| 2,736,696 | Wigner et al. | Feb. 28, 1956 |

OTHER REFERENCES

Atomics, May 1952.
Atomics, August 1953.
Nucleonics, August 1954.
Nuclear Engineering, part II, published by American Institute of Chemical Engineers, 25 West 45th St., N.Y. 36, N.Y.; part of the Chemical Engineering Progress Symposium Serial No. 12 (1954), vol. 50. The papers were presented at Ann Arbor, Mich., in June 1954.